(12) United States Patent
Awano

(10) Patent No.: US 9,102,356 B2
(45) Date of Patent: Aug. 11, 2015

(54) VEHICLE MANUFACTURING METHOD AND VEHICULAR STRUCTURAL BODY

(71) Applicant: HONDA MOTOR CO., LTD., Minato-ku, Tokyo (JP)

(72) Inventor: Katsuyuki Awano, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/140,010

(22) Filed: Dec. 24, 2013

(65) Prior Publication Data

US 2014/0183895 A1 Jul. 3, 2014

(30) Foreign Application Priority Data

Dec. 28, 2012 (JP) ................................. 2012-286489

(51) Int. Cl.
B62D 27/02 (2006.01)
B62D 29/00 (2006.01)
B60G 3/06 (2006.01)
B62D 21/11 (2006.01)

(52) U.S. Cl.
CPC ............... B62D 27/026 (2013.01); B60G 3/06 (2013.01); B62D 29/005 (2013.01); B60G 2200/142 (2013.01); B60G 2206/15 (2013.01); B62D 21/11 (2013.01)

(58) Field of Classification Search
CPC .................................................... B62D 27/026
USPC ........................................... 296/29; 280/785
See application file for complete search history.

(56) References Cited

U.S. PATENT DOCUMENTS

| 5,349,009 | A | * | 9/1994 | Furlan ........................... 524/563 |
| 5,683,536 | A | * | 11/1997 | Kneafsey ...................... 156/327 |
| 5,800,003 | A | * | 9/1998 | Clenet .............................. 296/29 |
| 6,416,119 | B1 | * | 7/2002 | Gericke et al. ................ 296/205 |
| 7,322,106 | B2 | * | 1/2008 | Marando et al. ............. 29/897.2 |
| 2010/0231005 | A1 | | 9/2010 | Yoshida et al. |
| 2013/0129409 | A1 | * | 5/2013 | Cho et al. ...................... 403/266 |

FOREIGN PATENT DOCUMENTS

| DE | 196 07 820 A1 | 9/1997 |
| DE | 199 29 057 A1 | 12/2000 |
| DE | 10 2010 013 344 A1 | 10/2011 |
| EP | 1508508 * | 2/2005 |
| JP | 3-72091 U | 7/1991 |

(Continued)

OTHER PUBLICATIONS

German Search Report dated Mar. 19, 2014 issued over the corresponding DE Patent Application No. 102013227185.9 with the English translation of pertinent portions.

(Continued)

*Primary Examiner* — Dennis H Pedder
(74) *Attorney, Agent, or Firm* — Carrier Blackman & Associates, P.C.; William D. Blackman; Joseph P. Carrier

(57) ABSTRACT

In a vehicular structural body and a method of manufacturing a vehicle, a distance between a first fastening surface and a second fastening surface is adjusted with a fastener in order to adjust a distance between a first bonding surface and a second bonding surface, whereby the thickness of an adhesive layer of an adhesive, which is applied or is to be applied between the first bonding surface and the second bonding surface, is adjusted.

17 Claims, 12 Drawing Sheets

(56) References Cited

FOREIGN PATENT DOCUMENTS

| | | |
|---|---|---|
| JP | 05-338560 A | 12/1993 |
| JP | 11-129933 A | 5/1999 |
| JP | 2000-344130 A | 12/2000 |
| JP | 2008-296823 A | 12/2008 |
| JP | 2011-088494 A | 5/2011 |
| JP | 2011-093449 A | 5/2011 |
| WO | WO2008002210 * | 1/2008 |

OTHER PUBLICATIONS

German Examination Report dated Mar. 20, 2014 issued over the corresponding DE Patent Application No. 102013227185.9 with the English translation of pertinent portions.

Office Action dated Feb. 17, 2015 issued over the corresponding JP Application No. 2012-286489 with the English translation of pertinent portion.

* cited by examiner

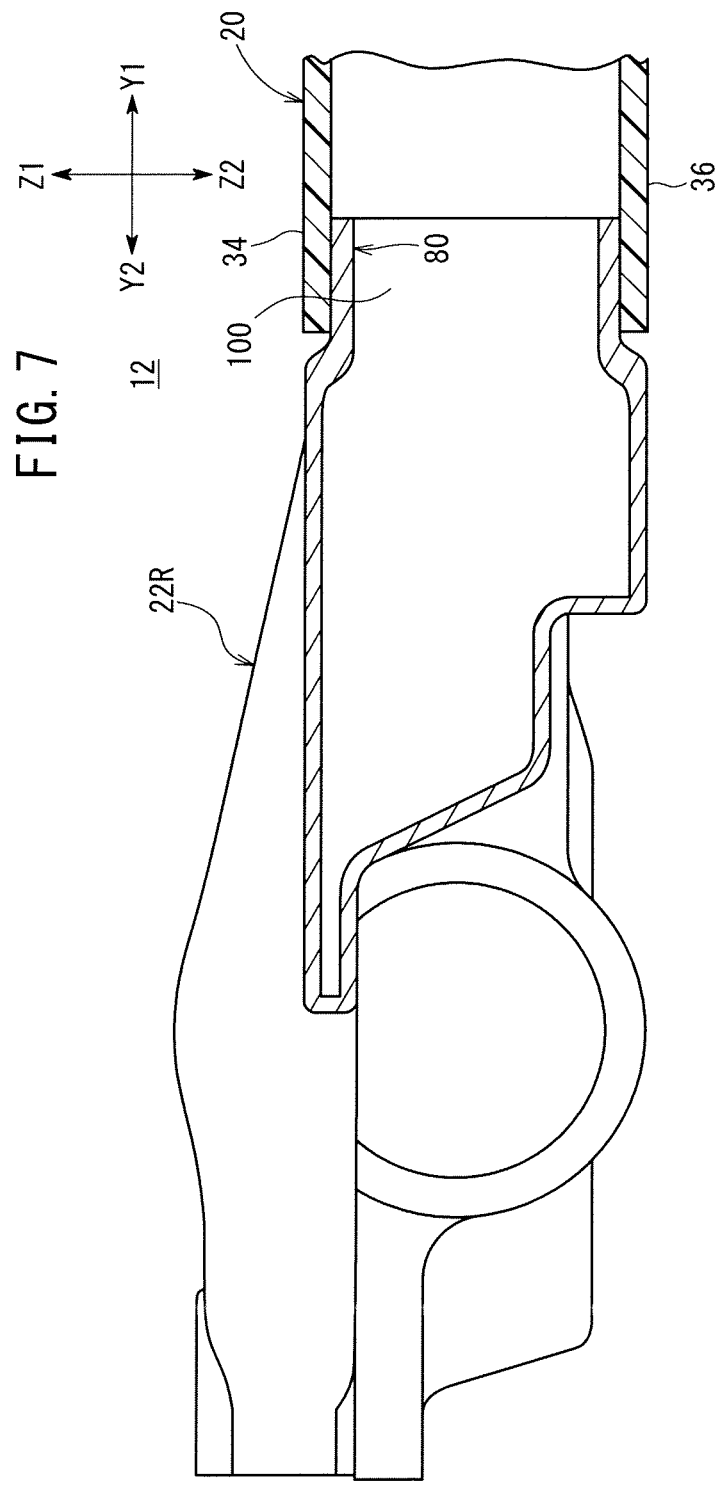

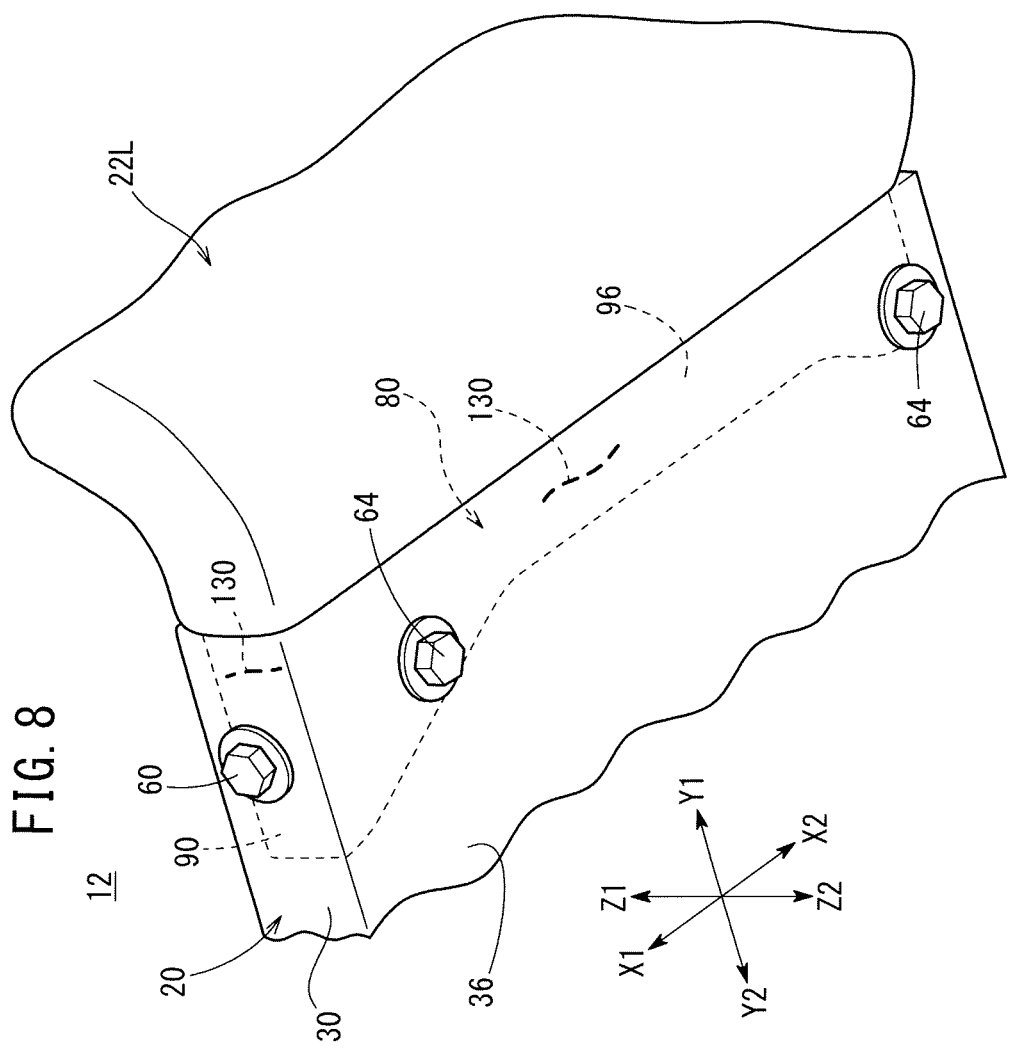

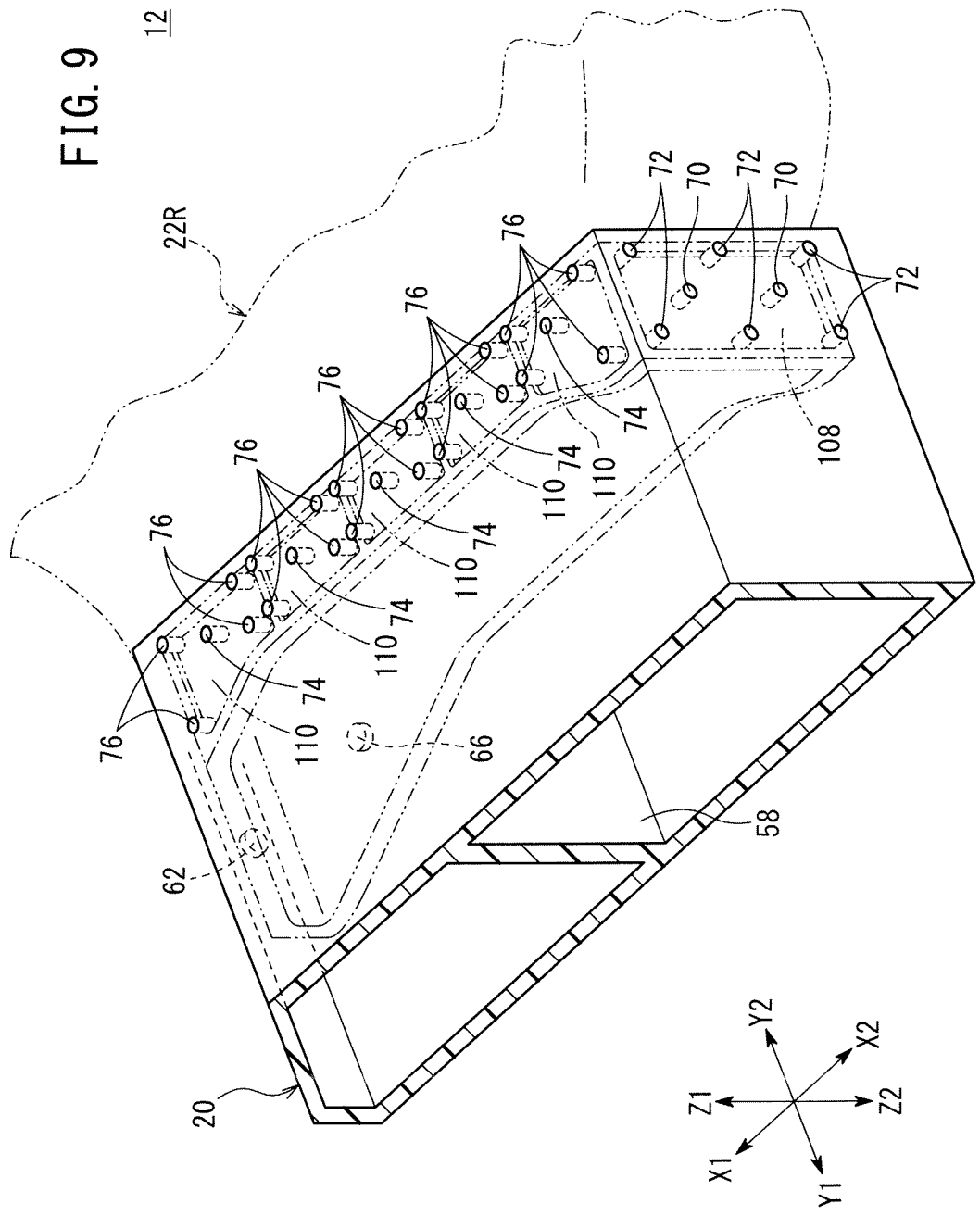

VEHICLE MANUFACTURING METHOD AND VEHICULAR STRUCTURAL BODY

CROSS-REFERENCE TO RELATED APPLICATION

This application is based upon and claims the benefit of priority from Japanese Patent Application No. 2012-286489 filed on Dec. 28, 2012, the contents of which are incorporated herein by reference.

BACKGROUND OF THE INVENTION

1. Field of the Invention

The present invention relates to a vehicular structural body made up of a plurality of members which are joined together, and a vehicle manufacturing method for manufacturing such a vehicular structural body.

2. Description of the Related Art

Japanese Laid-Open Patent Publication No. 2000-344130 (hereinafter referred to as "JP2000-344130A") discloses a suspension member 10 having a cross member 11, a right member 21, and a left member 31, each of which is made of high-tension sheet steel (Abstract). The right member 21 is joined to a right side of the cross member 11, whereas the left member 31 is joined to a left side of the cross member 11 (Abstract).

SUMMARY OF THE INVENTION

According to JP2000-344130A, as described above, the right member 21 is joined to the right side of the cross member 11, whereas the left member 31 is joined to the left side of the cross member 11. However, JP2000-344130A does not contain any specific description concerning how such members are joined together.

Furthermore, there is room for additional consideration not only concerning the suspension member 10 of JP2000-344130A, but also in relation to how the plurality of members that make up the vehicle are joined.

It is an object of the present invention to provide a vehicular structural body that can be made up of a plurality of members which are joined together appropriately, and a vehicle manufacturing method for manufacturing such a vehicular structural body.

According to the present invention, there is provided a method of manufacturing a vehicle including a vehicular structural body made up of a first member and a second member which are joined to each other, wherein the first member has a first joint to be joined to the second member, and the second member has a second joint to be joined to the first member, the method comprising the step of joining the first joint and the second joint to each other by fastening the first joint and the second joint to each other with a fastener, and bonding the first joint and the second joint to each other with an adhesive. The first joint has a first fastening surface fastened by the fastener, and a first bonding surface inclined with respect to the first fastening surface and bonded by the adhesive, and the second joint has a second fastening surface that faces toward the first fastening surface and is fastened by the fastener, and a second bonding surface, which is inclined with respect to the second fastening surface in confronting relation to the first bonding surface, and is bonded by the adhesive. The step of joining further comprises the step of adjusting a distance between the first fastening surface and the second fastening surface with the fastener in order to adjust a distance between the first bonding surface and the second bonding surface, thereby enabling a thickness of an adhesive layer of the adhesive, which is applied or is to be applied between the first bonding surface and the second bonding surface, to be adjusted.

According to the present invention, in the joining step, the distance between the first fastening surface and the second fastening surface is adjusted with the fastener in order to adjust the distance between the first bonding surface and the second bonding surface, thus enabling the thickness of the adhesive layer, which is applied or is to be applied between the first bonding surface and the second bonding surface, to be adjusted. Therefore, it is possible to easily manage the thickness of the adhesive layer, which is used to join the first member and the second member to each other.

The method may further comprise the step of positionally adjusting the fastener while a spacer is placed between the first bonding surface and the second bonding surface. Therefore, the distance between the first bonding surface and the second bonding surface, and hence the thickness of the adhesive layer, can be adjusted more easily.

Each of the first joint and the second joint may be of a closed cross-sectional shape, and the step of joining may further comprise the step of fastening the first joint and the second joint to each other with the fastener, and bonding the first joint and the second joint to each other with the adhesive while the first joint and the second joint are interfitted. The first joint and the second joint are fastened to each other by the fastener, and are bonded mutually by the adhesive while the closed cross-sectional shapes thereof are interfitted. Therefore, it is possible to widen areas that are coated with the adhesive and thereby increase the strength with which the first member and the second member are joined together.

The first joint may further include an adhesive introducing surface having an inlet port defined therein for introducing the adhesive into the first member, and the method may further comprise the step of, after the first joint and the second joint have been interfitted, adjusting the distance between the first fastening surface and the second fastening surface with the fastener in order to adjust the distance between the first bonding surface and the second bonding surface, and thereafter introducing the adhesive into the first member through the inlet port. In this case, since the adhesive is introduced into other regions apart from the region between the first bonding surface and the second bonding surface, the first member and the second member can be joined together more strongly.

The first member may be made of carbon-fiber-reinforced plastic, for example, and the second member may be made of aluminum, for example. If constituted in this manner, the vehicular structural body can be reduced in weight.

According to the present invention, there also is provided a vehicular structural body comprising a first member and a second member of a vehicle, wherein the first member comprises a first joint to be joined to the second member, and the second member comprises a second joint to be joined to the first member. The vehicular structural body further comprises a fastener for fastening the first joint and the second joint to each other, and an adhesive for bonding the first joint and the second joint to each other. The first joint has a first fastening surface fastened by the fastener and a first bonding surface, which is inclined with respect to the first fastening surface and is bonded by the adhesive, and the second joint has a second fastening surface that faces toward the first fastening surface and is fastened by the fastener, and a second bonding surface, which is inclined with respect to the second fastening surface in confronting relation to the first bonding surface, and is bonded by the adhesive. The fastener comprises an adhesive thickness adjusting member for adjusting a distance between the first fastening surface and the second fastening surface in order to adjust the thickness of an adhesive layer of the adhesive, which is disposed between the first bonding surface and the second bonding surface.

The vehicular structural body may further comprise a spacer disposed between the first bonding surface and the second bonding surface.

If each of the first joint and the second joint is of a closed cross-sectional shape, then the first joint and the second joint may be fastened to each other with the fastener, and the first joint and the second joint may be bonded to each other with the adhesive while the first joint and the second joint are interfitted.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a fragmentary cross-sectional view (front fragmentary cross-sectional view) taken along line VII-VII of FIG. 2;

FIG. 8 is a first perspective view (showing front, bottom, and left-hand side perspective views) of a portion of the subframe;

FIG. 9 is a second perspective view (showing rear, top, and left-hand side perspective views) of a portion of the subframe;

DESCRIPTION OF THE PREFERRED EMBODIMENTS

Figure 1:
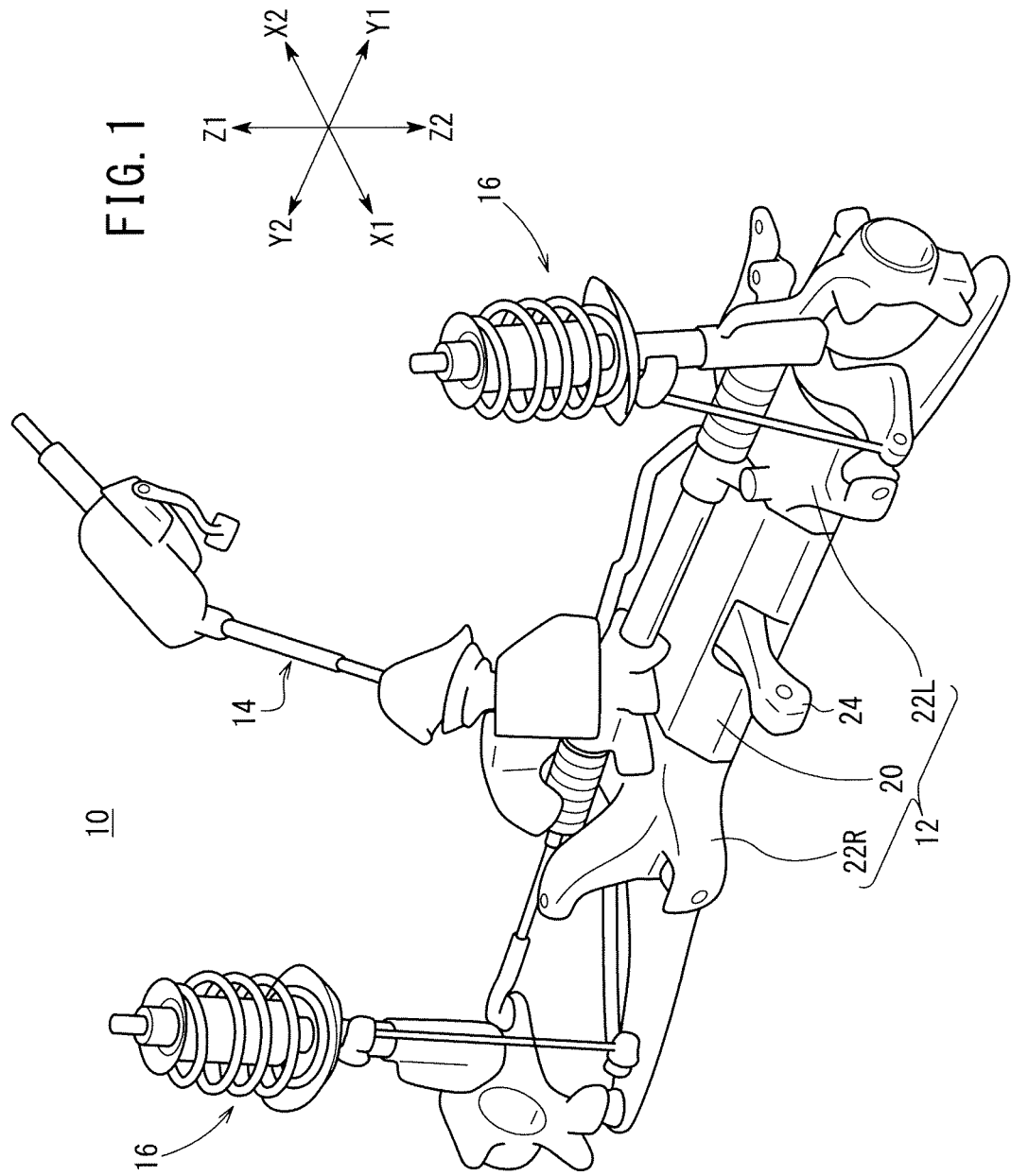
FIG. 1 is a perspective view (showing front, top, and left-hand side perspective views) of a portion of a vehicle incorporating a subframe as a vehicular structural body according to an embodiment of the present invention.

A. Embodiment
1. Description of Overall Structure
[1-1. Overall Structure]
FIG. 1 is a perspective view (showing front, top, and left-hand side perspective views) of a portion of a vehicle 10 incorporating a subframe 12 as a vehicular structural body according to an embodiment of the present invention. In FIG. 1 and in subsequent figures to be described below, arrows X1, X2, Y1, Y2, Z1, Z2 represent respective directions in relation to the vehicle 10. More specifically, the arrows X1, X2 represent longitudinal directions of the vehicle 10, the arrows Y1, Y2 represent transverse (lateral) directions of the vehicle 10, and the arrows Z1, Z2 represent heightwise (vertical) directions of the vehicle 10.

As shown in FIG. 1, in addition to the subframe 12, the vehicle 10 includes suspensions 16, and a steering mechanism 14 for changing the angle of the front wheels, not shown, depending on the degree to which a non-illustrated steering wheel is turned.

Figure 2:
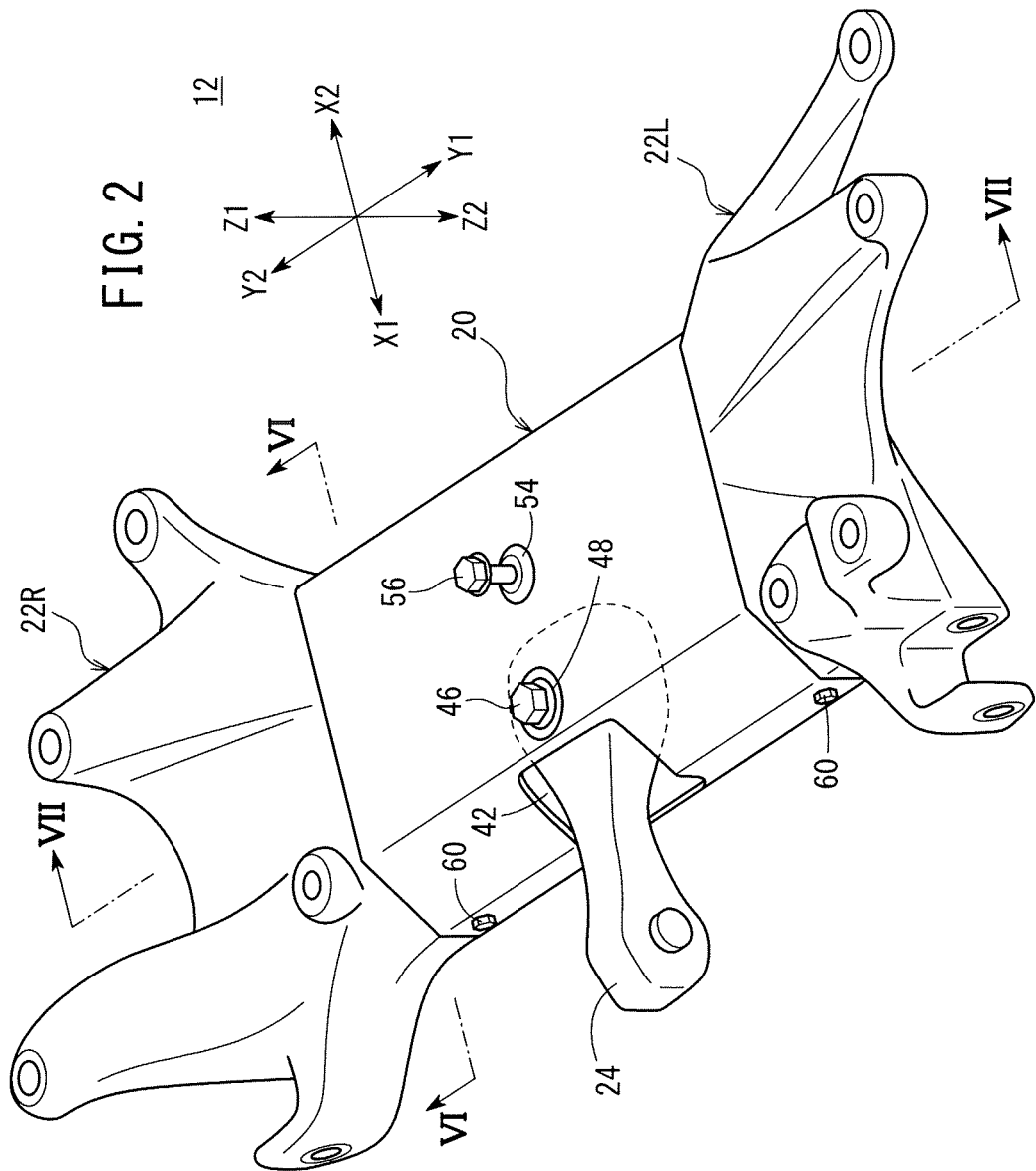
FIG. 2 is a perspective view (showing front, top, and left-hand side perspective views) of the subframe.

[1-2. Subframe 12]
(1-2-1. Overall Structure of Subframe 12)
FIG. 2 is a perspective view (showing front, top, and left-hand side perspective views) of the subframe 12. The subframe 12 supports an engine, not shown, the steering mechanism 14, and the suspensions 16. The relationship between the subframe 12 and peripheral parts located in the vicinity of the subframe 12 may be based on the details disclosed in U.S. Patent Application Publication No. 2010/0231005, for example.

The subframe 12 includes a central beam 20 serving as a central member, and a left bracket 22L and a right bracket 22R (hereinafter referred to as "side brackets 22L, 22R") that serve as side members, and which are disposed on left and right sides of the central beam 20. As described in detail later, the central beam 20 and the side brackets 22L, 22R are joined to each other by front bolts 60 (see FIG. 2, etc.), lower bolts 64 (see FIG. 8, etc.), and an adhesive 200 (see FIGS. 10A, 10B). The front bolts 60 and the lower bolts 64 function as fasteners, respectively.

Figure 3:
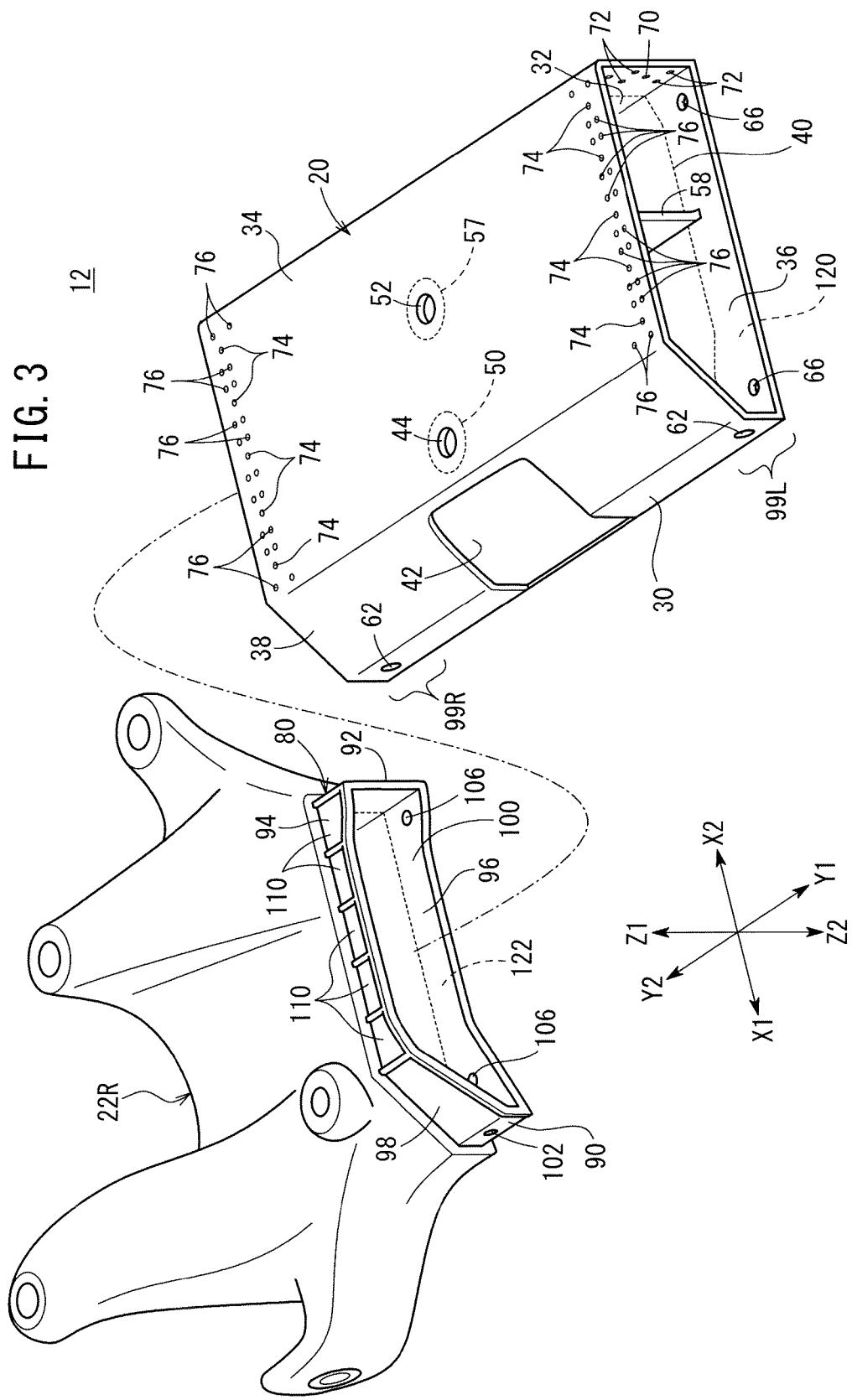
FIG. 3 is an exploded perspective view (showing front, top, and left-hand side exploded perspective views) of a portion of the subframe.
Figure 4:
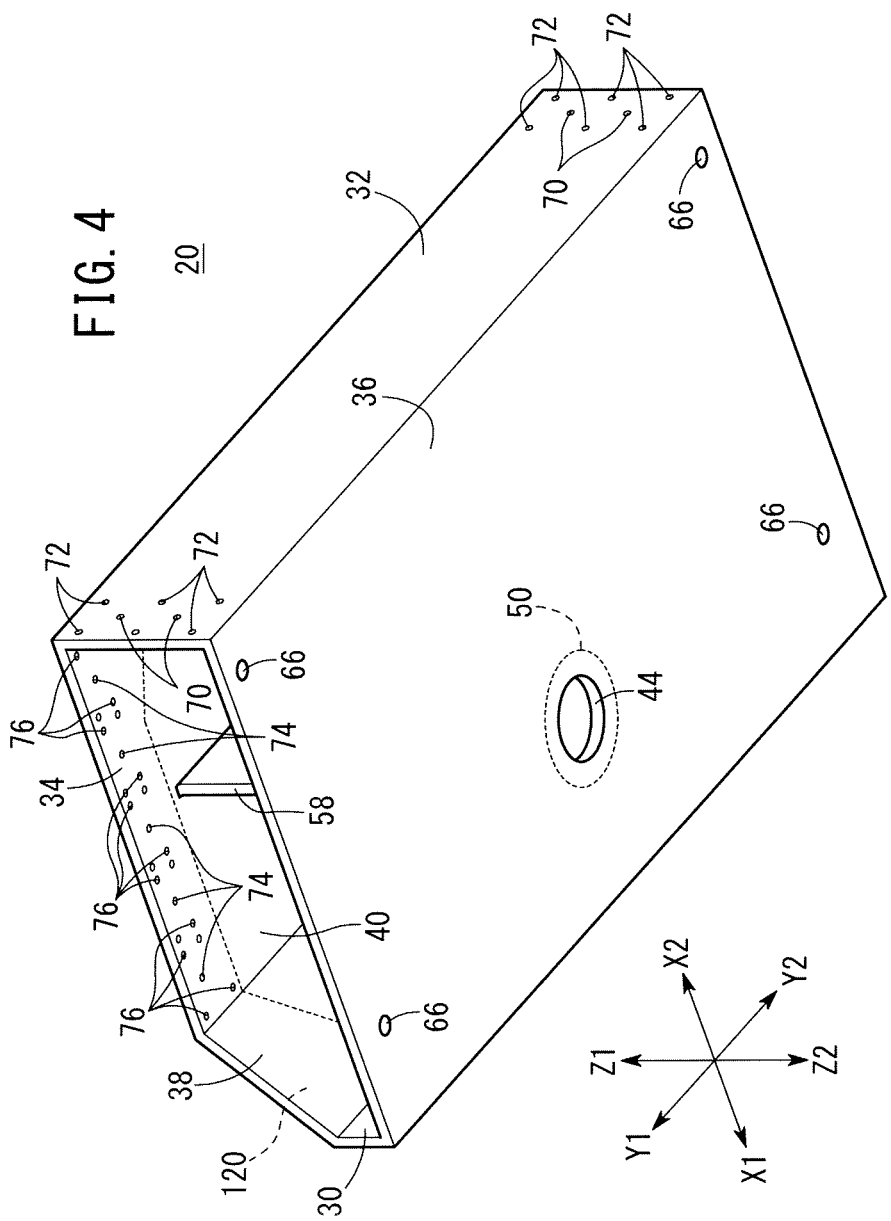
FIG. 4 is a perspective view (showing rear, bottom, and left-hand side perspective views) of a central beam.
Figure 5:
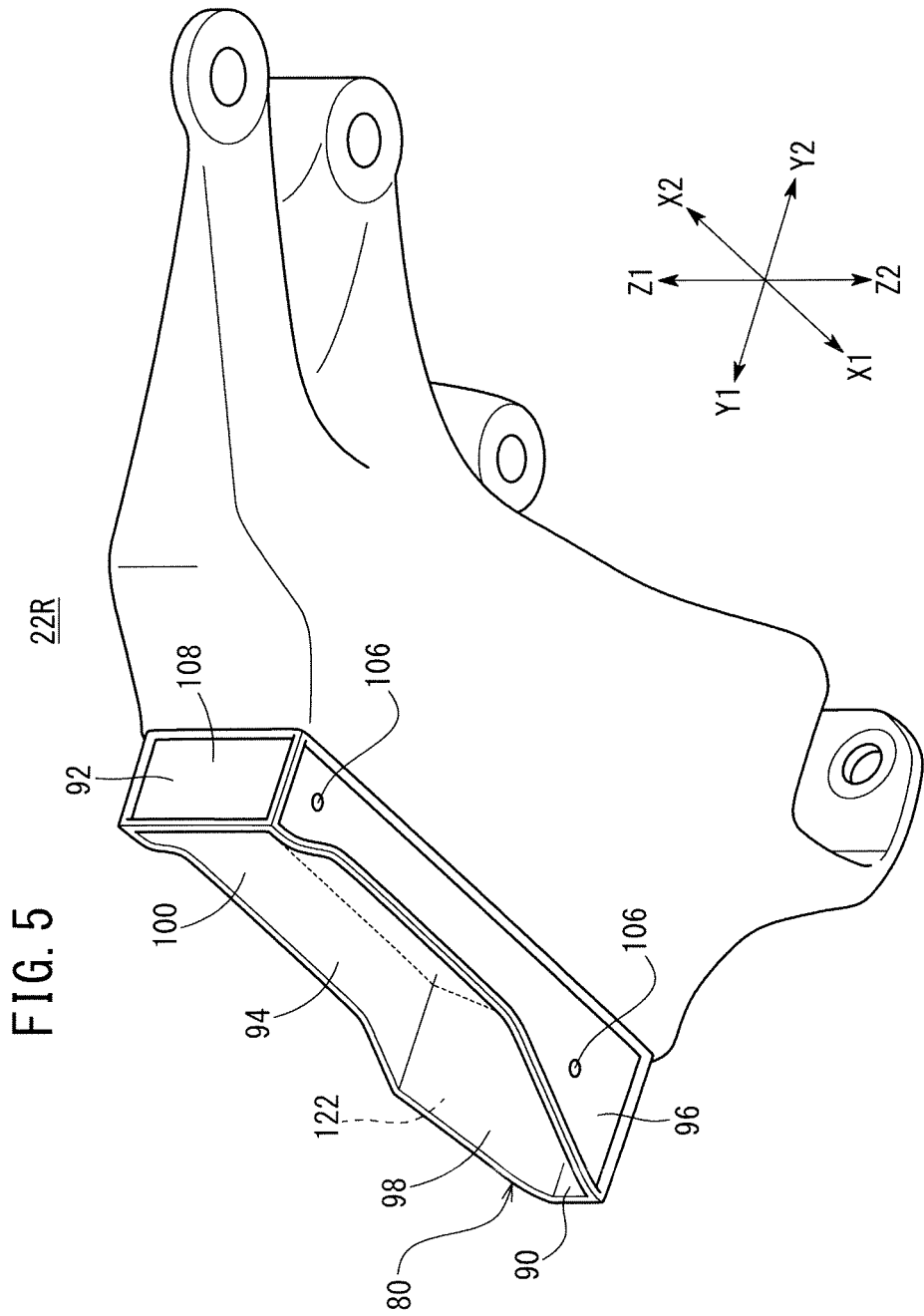
FIG. 5 is a perspective view (showing rear, bottom, and left-hand side perspective views) of a right bracket.
Figure 6:
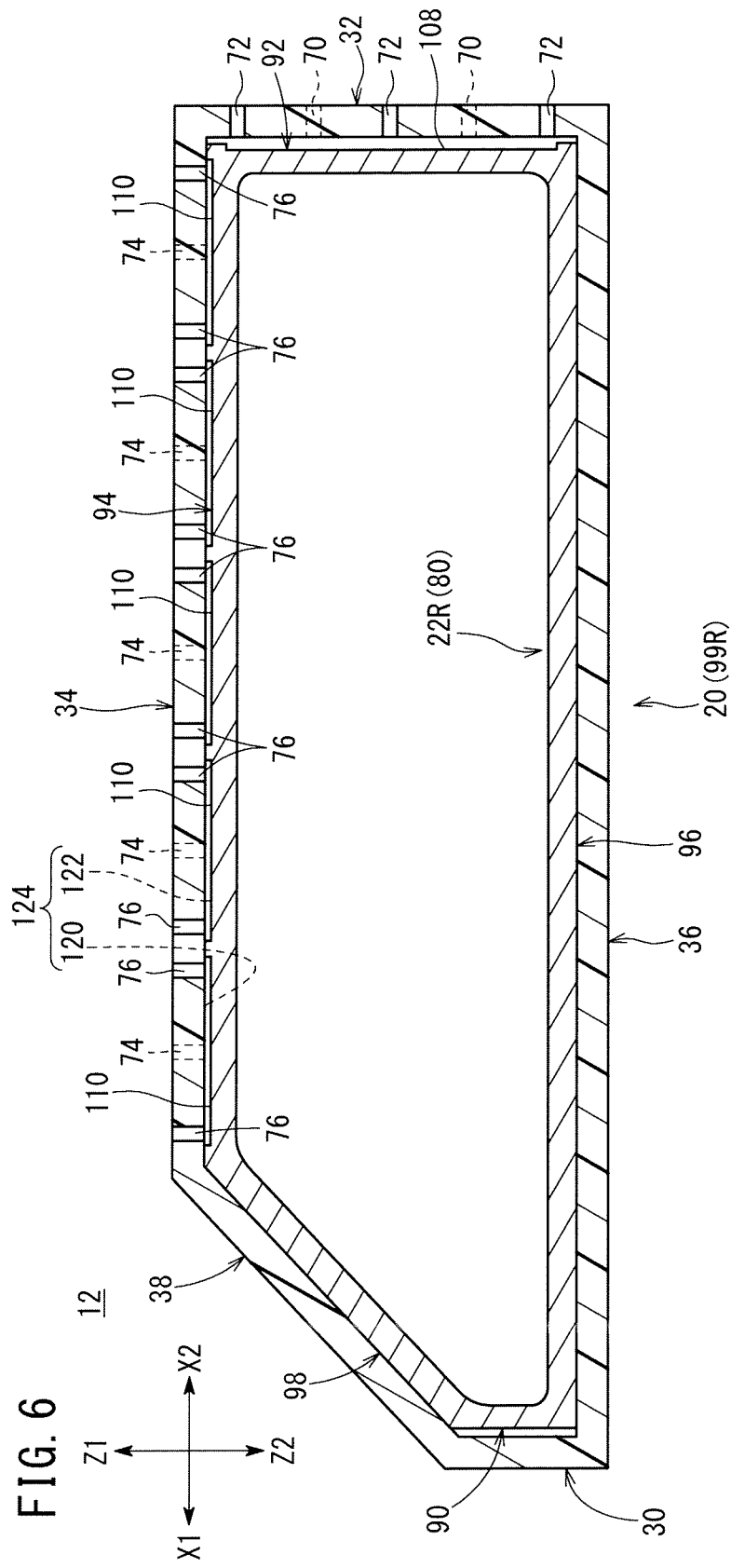
FIG. 6 is a cross-sectional view (left-hand side cross-sectional view) taken along line VI-VI of FIG. 2.

FIG. 3 is an exploded perspective view (showing front, top, and left-hand side exploded perspective views) of a portion of the subframe 12. The left bracket 22L, which is omitted from illustration in FIG. 3, is structurally symmetrical to the right bracket 22R. FIG. 4 is a perspective view (showing rear, bottom, and left-hand side perspective views) of the central beam 20. FIG. 5 is a perspective view (showing rear, bottom, and left-hand side perspective views) of the right bracket 22R. The left bracket 22L has a similar structure (symmetrical structure) to the right bracket 22R. FIG. 6 is a cross-sectional view (left-hand side cross-sectional view) taken along line VI-VI of FIG. 2. FIG. 7 is a fragmentary cross-sectional view (front fragmentary cross-sectional view) taken along line VII-VII of FIG. 2. FIG. 8 is a first perspective view (showing front, bottom, and left-hand side perspective views) of a portion of the subframe 12. FIG. 9 is a second perspective view (showing rear, top, and left-hand side perspective views) of a portion of the subframe 12.

(1-2-2. Central Beam 20)
The central beam 20 supports an engine (not shown) with a support rod 24 (see FIG. 1, etc.). According to the present embodiment, the central beam 20 is made of carbon-fiber-reinforced plastic (CFRP).

As shown in FIGS. 3 and 4, the central beam 20 comprises a hollow member, which is basically of a rectangular cross-sectional shape having a front wall 30, a rear wall 32, a top wall 34, and a bottom wall 36. The central beam 20 also includes, on a front side thereof, a slanted wall 38, which is inclined downwardly from the top wall 34 toward the front wall 30. Therefore, the central beam 20 is of a closed cross-sectional shape with openings 40 defined in left and right ends thereof.

The central beam 20 has a rod opening 42, which is defined in the front wall 30 and the slanted wall 38, and through which the support rod 24 passes. The central beam 20 also has bolt holes 44, which are defined in the top wall 34 and the bottom wall 36, for securing a rod support bolt 46 (see FIG. 2) that supports the support rod 24. Nuts 48 (see FIG. 2) for securing the rod support bolt 46 are bonded by the adhesive 200 to the top wall 34 and the bottom wall 36. As indicated by the broken lines in FIGS. 3 and 4, the adhesive 200, which serves to bond the nuts 48, is applied to regions 50 of the top wall 34 and the bottom wall 36 in the vicinity of the bolt holes 44.

The central beam 20 has a fixing hole 52 defined in the top wall 34 for fixing a portion (gearbox) of the steering mechanism 14. A nut 54 (see FIG. 2), which secures a bolt 56 that fixes the gearbox, is bonded by the adhesive 200 to the top wall 34. As indicated by the broken line in FIG. 3, the adhesive 200, which serves to bond the nut 54, is applied to a region 57 of the top wall 34 in the vicinity of the fixing hole 52.

A rib 58 for increasing the mechanical strength of the central beam 20 is disposed between the top wall 34 and the bottom wall 36.

The front wall 30, the rear wall 32, the top wall 34, and the bottom wall 36 of the central beam 20 include structural features, which enable joining thereof to the side brackets 22L, 22R by means of the front bolts 60, the lower bolts 64, and the adhesive 200. More specifically, the front wall 30 has front through holes 62 (see FIGS. 3 and 4) for insertion of front bolts 60 therethrough, and the bottom wall 36 has lower through holes 66 (see FIGS. 3 and 4) for insertion of lower bolts 64 therethrough.

As shown in FIGS. 3 and 4, the central beam 20 has a plurality of rear inlet ports 70 defined in the rear wall 32 for introducing the adhesive 200 into the central beam 20, and a plurality of rear confirmation holes 72 for confirming the extent to which the adhesive 200 has been introduced into the central beam 20 or has filled the central beam 20. Each of the rear inlet ports 70 is positioned at the center of a set of four rear confirmation holes 72, which surround the rear inlet port 70.

As shown in FIGS. 3 and 4, the central beam 20 also has a plurality of upper inlet ports 74 defined in the top wall 34 thereof for introducing the adhesive 200 into the central beam 20, and a plurality of top confirmation holes 76 for confirming the extent to which the adhesive 200 has been introduced into the central beam 20 or has filled the central beam 20. Four top confirmation holes 76 surround each of the upper inlet ports 74 as a set, each of the upper inlet ports 74 being positioned in the center of the set. The number of upper inlet ports 74 and top confirmation holes 76 are not limited to the illustrated quantity, but may be provided in a quantity that depends on the position and shape of a region to be filled with the adhesive 200.

For the sake of brevity, the inlet ports 70, 74 and the confirmation holes 72, 76 are omitted from illustration in FIGS. 1 and 2.

(1-2-3. Side Brackets 22L, 22R)

The side brackets 22L, 22R are fixed to a main frame (not shown) of the vehicle 10, so as to support the subframe 12 in its entirety on the main frame, as well as to support the steering mechanism 14 and the suspensions 16, as shown in FIG. 1. According to the present embodiment, the side brackets 22L, 22R are in the form of hollow members made of aluminum.

As shown in FIG. 3, each of the side brackets 22L, 22R has a bracket joint portion 80 (hereinafter referred to as a "joint portion 80") formed on an end facing the central beam 20 for joining the bracket to the central beam 20.

As shown in FIGS. 3 and 5, the joint portion 80 comprises a hollow member, which basically is formed in a substantially rectangular cross-sectional shape having a front wall 90, a rear wall 92, a top wall 94, and a bottom wall 96. The joint portion 80 includes on a front side thereof a slanted wall 98, which is inclined downwardly from the top wall 94 toward the front wall 90. The joint portion 80 is of a closed cross-sectional shape, with an opening 100 defined in one end thereof facing toward the central beam 20.

The joint portion 80 is substantially the same in cross-sectional shape as the central beam 20, and has an outer peripheral shape slightly smaller than the inner peripheral shape of the central beam 20. Therefore, the opposite ends 99L, 99R of the central beam 20 can be fitted over the respective joint portions 80 of the side brackets 22L, 22R.

As shown in FIGS. 3 and 5, the slanted wall 98 and front portions of the top wall 94 and the bottom wall 96 are formed progressively wider, i.e., longer in the transverse directions Y1, Y2, forwardly along the longitudinal direction X1. The slanted wall 98 and the front portions of the top wall 94 and the bottom wall 96, which are formed progressively wider, provide a wider front adhesive bonding area through which the side brackets 22L, 22R and the central beam 20 can be bonded together with a higher adhesive bonding strength. Rear portions of the top wall 94 and the bottom wall 96 are formed progressively wider rearwardly along the longitudinal direction X2. The rear portions of the top wall 94 and the bottom wall 96, which are formed progressively wider, provide a wider rear adhesive bonding area through which the side brackets 22L, 22R and the central beam 20 can be bonded together with a higher adhesive bonding strength.

The front wall 90, the rear wall 92, the top wall 94, and the bottom wall 96 of each of the side brackets 22L, 22R have structural features for enabling joining thereof to the central beam 20 by means of the front bolts 60, the lower bolts 64, and the adhesive 200. More specifically, the front wall 90 has a front through hole 102 (see FIGS. 3 and 5) for insertion of the front bolt 60 therethrough, and the bottom wall 96 has lower through holes 106 (see FIGS. 3 and 5) for insertion of the lower bolts 64 therethrough.

As shown in FIG. 5, the rear wall 92 has a rear recess 108 defined in a rear surface thereof for guiding the adhesive 200. As shown in FIG. 3, the top wall 94 has a plurality of top recesses 110 defined in an upper surface thereof for guiding the adhesive 200. The rear recess 108 is provided as a single recess, which is associated with all of the rear inlet ports 70 and the rear confirmation holes 72 on one side of the central beam 20. The top recesses 110 are provided in association with all of the sets of the one upper inlet port 74 and the four top confirmation holes 76 on one side of the central beam 20.

Joint regions of the central beam 20 and the side brackets 22L, 22R are defined as follows. Inner surfaces of the front wall 30, the rear wall 32, the top wall 34, and the bottom wall 36 of the central beam 20, which are joined respectively to the side brackets 22L, 22R, are referred to as beam joint surfaces 120 (see FIG. 3). Outer surfaces of the front wall 90, the rear wall 92, the top wall 94, and the bottom wall 96 of each of the side brackets 22L, 22R, which are joined respectively to the central beam 20, are referred to as bracket joint surfaces 122 (see FIG. 3). The beam joint surfaces 120 and the bracket joint surfaces 122 are collectively referred to as an overall joint 124 (see FIG. 6).

(1-2-4. Joined Regions of Central Beam 20 and Side Brackets 22L, 22R)

As described above, the ends 99L, 99R of the central beam 20 are joined to the joint portions 80 of the side brackets 22L, 22R. More specifically, as shown in FIGS. 6 and 7, the ends 99L, 99R of the central beam 20 are inserted, respectively, into the bracket joint portions 80 of the side brackets 22L, 22R, so that the central beam 20 is positioned outside of the side brackets 22L, 22R.

As shown in FIG. 8, the front bolts 60 are provided for fastening the front wall 30 of the central beam 20 and the front walls 90 of the side brackets 22L, 22R to each other. The front bolts 60 are positioned at the center of the joint portions 80 along the transverse directions Y1, Y2.

The bottom wall 36 of the central beam 20 and the bottom walls 96 of the side brackets 22L, 22R are fastened to each other by the lower bolts 64, which are located in front and rear positions, respectively, on each of the side brackets 22L, 22R. The lower bolts 64 are positioned at the center of the joint portions 80 along the transverse directions Y1, Y2. As described above, the width of the joint portions 80 along the longitudinal directions X1, X2 (see FIGS. 3 and 5) is not constant. Therefore, when the lower bolts 64 are viewed along the longitudinal directions X1, X2, the lower bolts 64 are positioned out of alignment with each other along the transverse directions Y1, Y2.

As shown in FIG. 9, the rear inlet ports 70 and the rear confirmation holes 72 of the central beam 20 are positioned over the rear recesses 108 of the side brackets 22L, 22R. The upper inlet ports 74 and the top confirmation holes 76 of the central beam 20 are positioned over the top recesses 110 of the side brackets 22L, 22R.

2. Process of Assembling Subframe 12 (Process for Joining Central Beam 20 and Side Brackets 22L, 22R):

[2-1. General]

For assembling the subframe 12, the joint portions 80 of the side brackets 22L, 22R are inserted or fitted into the central beam 20 and fastened to the central beam 20 by the bolts, i.e., the front bolts 60 and the lower bolts 64. Further, the joint portions 80 of the side brackets 22L, 22R are bonded to the central beam 20 by the adhesive 200, thereby joining the central beam 20 and the side brackets 22L, 22R to each other.

According to the present embodiment, the adhesive 200 is applied as a coextensive adhesive layer between the beam joint surfaces 120 and the bracket joint surfaces 122. It is particularly important to manage the thickness of the adhesive layer of the adhesive 200 between the slanted walls 38, 98 (hereinafter referred to as a "front thickness Tf") and the thickness of the adhesive layer of the adhesive 200 between the bottom walls 36, 96 (hereinafter referred to as a "lower thickness Tl"). The reason for such thickness management is that, since the subframe 12 is positioned in front of the non-illustrated passenger compartment of the vehicle 10 (see FIG. 1) according to the present embodiment, there is a strong need for the subframe 12 in order to provide protection against head-on collisions.

According to the present embodiment, for managing the front thickness Tf and the lower thickness Tl, the central beam 20 and the side brackets 22L, 22R include the slanted walls 38, 98, and are fastened to each other by the front bolts 60 and the lower bolts 64. Management of the front thickness Tf and the lower thickness Tl, and fastening of the central beam 20 and the side brackets 22L, 22R by means of the front bolts 60 and the lower bolts 64, will be described below.

[2-2. Process for Managing Front Thickness Tf and Lower Thickness Tl]

Figure 10A:
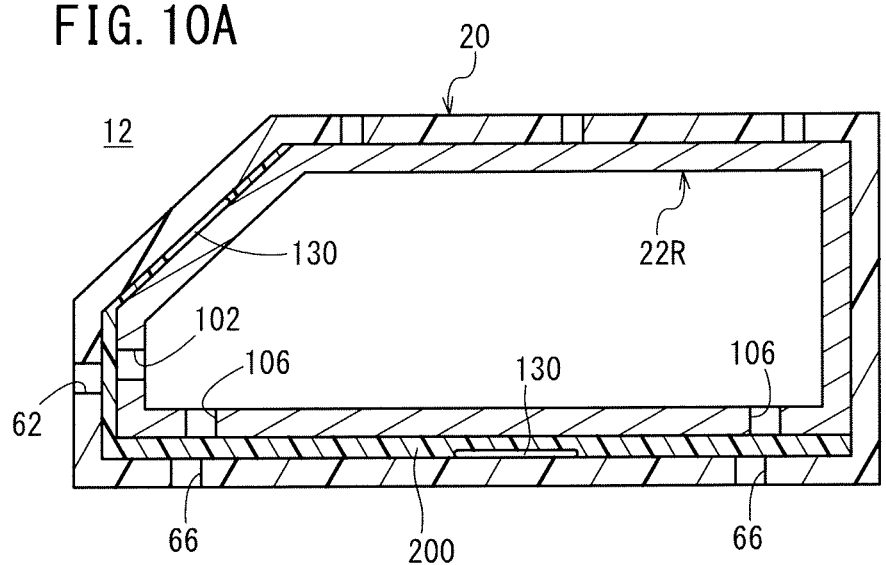
FIG. 10A is a cross-sectional view (left-hand side cross-sectional view) showing in simplified form a state in which the right bracket has just been fitted into the central beam.
Figure 10B:
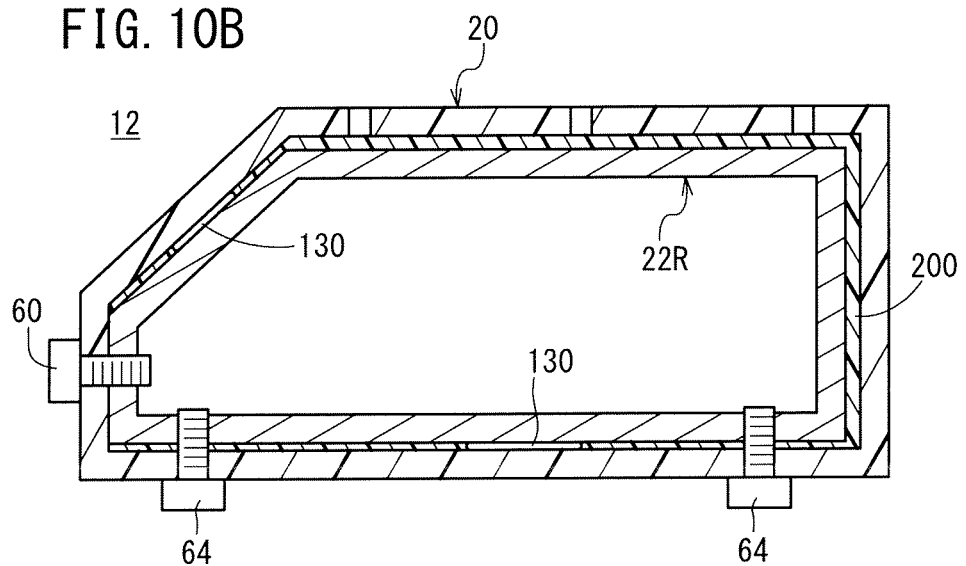
FIG. 10B is a cross-sectional view (left-hand side cross-sectional view) showing in simplified form a state in which front bolts and lower bolts have been tightened in the central beam with the right bracket fitted therein as shown in FIG. 10A.

FIG. 10A is a cross-sectional view (left hand side cross-sectional view) showing in simplified form a state in which the joint portion 80 of the right bracket 22R has just been fitted into the central beam 20. FIG. 10B is a cross-sectional view (left hand side cross-sectional view) showing in simplified form a state in which the front bolts 60 and the lower bolts 64 have been tightened in the central beam 20, and the right bracket 22R is fitted therein as shown in FIG. 10A. As may be by a comparison of FIGS. 10A-10B, each of the front bolts 60 and the lower bolts 64 is a threaded fastener, which may be tightened to reduce the distance between the central beam 20 and the bracket 22R in the immediate area surrounding the joint where each bolt, respectively, connects the central beam and the bracket. Although FIGS. 10A and 10B illustrate the relationship between the central beam 20 and the right bracket 22R, the same features also apply to the relationship between the central beam 20 and the left bracket 22L.

With the central beam 20 and the right bracket 22R in the state shown in FIG. 10A, the front thickness Tf and the lower thickness Tl do not necessarily conform respectively to pre-scribed values (hereinafter referred to as a "front prescribed value Vf" and a "lower prescribed value Vl"). The front thickness Tf and the lower thickness Tl are adjusted in conformity with the front prescribed value Vf and the lower prescribed value Vl in the following manner. The front bolts 60 are tightened in order to adjust the front thickness Tf. More specifically, an adhesive thickness management wire 130 (hereinafter also referred to as a "wire 130") (see FIG. 8) is placed on the slanted wall 98 of each of the side brackets 22L, 22R. The wire 130 has a diameter equal to the front prescribed value Vf.

The front bolts 60 are tightened in order to move the slanted wall 38 of the central beam 20 and the slanted walls 98 of the side brackets 22L, 22R in directions to approach each other. The front thickness Tf becomes equalized to the front prescribed value Vf upon tightening of the front bolts 60 until the slanted wall 38 of the central beam 20 and the slanted walls 98 of the side brackets 22L, 22R are prevented by the wires 130 from moving further toward each other.

Similarly, the lower bolts 64 are tightened in order to adjust the lower thickness Tl. More specifically, a wire 130 (see FIG. 8) is placed on the bottom wall 96 of each of the side brackets 22L, 22R. The wire 130 has a diameter equal to the lower prescribed value Vl. According to the present embodiment, since the front prescribed value Vf and the lower prescribed value Vl are equal to each other, the same wires 130 may be used in order to adjust the front thickness Tf and the lower thickness Tl.

The lower bolts 64 are tightened in order to move the bottom wall 36 of the central beam 20 and the bottom walls 96 of the side brackets 22L, 22R in directions to approach each other. The lower thickness Tl becomes equalized to the lower prescribed value Vl upon tightening of the lower bolts 64 until the bottom wall 36 of the central beam 20 and the bottom walls 96 of the side brackets 22L, 22R are prevented by the wires 130 from moving further toward each other.

[2-3. Assembly Flow for Subframe 12]

Figure 11:
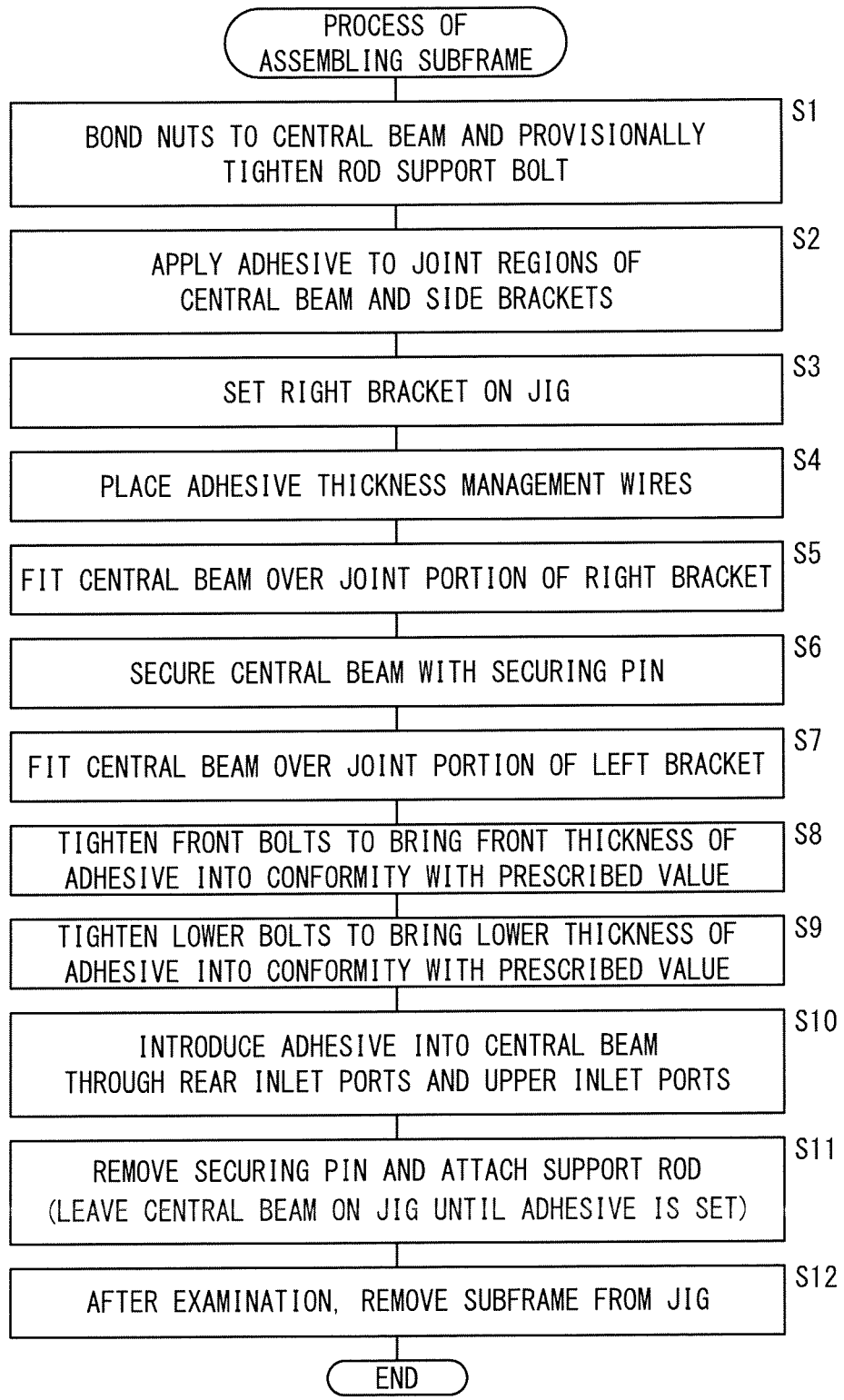
FIG. 11 is a flowchart of a working sequence for assembling the subframe.
Figure 12:
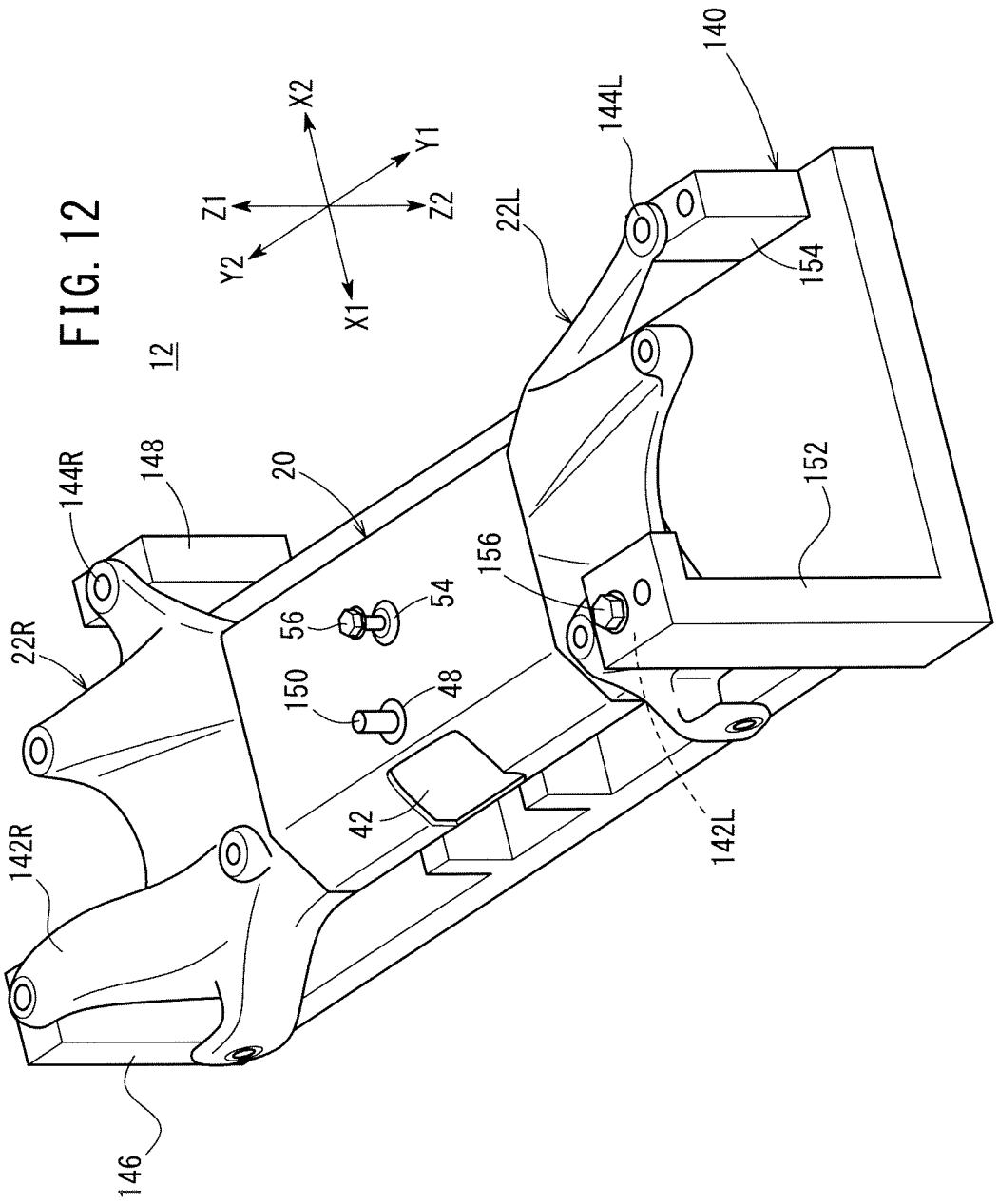
FIG. 12 is a perspective view (showing front, top, and left-hand side elevational views), illustrating the manner in which the subframe is placed on a jig.

FIG. 11 is a flowchart of a working sequence for assembling the subframe 12. The working sequence shown in FIG. 11 is carried out by a manufacturing apparatus or a worker, not shown. FIG. 12 is a perspective view (showing front, top, and lefthand side elevational views), which illustrates the manner in which the subframe 12 is placed on a jig 140.

In step S1 of FIG. 11, the nuts 48, 54 are bonded to the central beam 20, and the rod support bolt 46 is provisionally tightened via the nuts 48. In step S2, the adhesive 200 is applied to the joint regions of the central beam 20 and the side brackets 22L, 22R, i.e., the beam joint surfaces 120 and the bracket joint surfaces 122.

In step S3, the right bracket 22R is set on the jig 140. More specifically, portions, i.e., the protrusive arms 142R, 144R (see FIG. 12) of the right bracket 22R, are fixed by non-illustrated bolts to respective support columns 146, 148 of the jig 140.

In step S4, the adhesive thickness management wires 130 (see FIG. 8) are placed in position. As described above, the wires 130 have the same diameter as a target value (the front prescribed value Vf and the lower prescribed value V1) for the thickness of the adhesive layer of the adhesive 200. In other words, the wires 130 function as spacers when the wires 130 are placed between the central beam 20 and the side brackets 22L, 22R. More specifically, the wires 130 are placed on outer surfaces of the bottom walls 96 and the slanted walls 98 of the side brackets 22L, 22R. Since the adhesive 200 has already been applied to the side brackets 22L, 22R in step S2, once placed in position, the wires 130 do not fall off from the outer surfaces of the bottom walls 96 and the slanted walls 98 of the side brackets 22L, 22R.

In step S5, the central beam 20 is moved and fitted over the joint portion 80 of the right bracket 22R.

In step S6, the central beam 20 is secured in position on the jig 140 by a securing pin 150 (see FIG. 12). More specifically, the rod support bolt 46 is removed and the securing pin 150 is tightened via the nuts 48, thereby securing the central beam 20 in a transverse position with respect to the jig 140.

In step S7, the left bracket 22L is moved so that the joint portion 80 is fitted into the central beam 20, and the left bracket 22L is set on the jig 140. More specifically, portions, i.e., the protrusive arms 142L, 144L (see FIG. 12) of the left bracket 22L, are fixed by bolts 156 to respective support columns 152, 154 of the jig 140.

In step S8, the left and right front bolts 60 (two front bolts 60) are tightened in order to adjust the front thickness Tf of the adhesive layer of the adhesive 200, which is provided between the slanted wall 38 of the central beam 20 and the slanted walls 98 of the side brackets 22L, 22R, in conformity with the front prescribed value Vf. According to the present embodiment, in step S4, the wires 130 are placed on the slanted walls 98 of the side brackets 22L, 22R. Therefore, upon the front bolts 60 being tightened until the slanted wall 38 of the central beam 20 and the slanted walls 98 of the side brackets 22L, 22R are prevented by the wires 130 from moving further toward each other, the front thickness Tf becomes equalized to the front prescribed value Vf.

In step S9, the lower bolts 64 (four lower bolts 64) are tightened in order to adjust the lower thickness Tl of the adhesive layer of the adhesive 200, which is provided between the bottom wall 36 of the central beam 20 and the bottom walls 96 of the side brackets 22L, 22R, in conformity with the lower prescribed value Vl. According to the present embodiment, in step S4, the wires 130 are placed on the bottom walls 96 of the side brackets 22L, 22R. Therefore, upon the lower bolts 64 being tightened until the bottom wall 36 of the central beam 20 and the bottom walls 96 of the side brackets 22L, 22R are prevented by the wires 130 from moving further toward each other, the lower thickness Tl becomes equalized to the lower prescribed value Vl.

In step S10, the adhesive 200 is introduced into the central beam 20 through the rear inlet ports 70 and the upper inlet ports 74. According to the present embodiment, the adhesive 200 comprises a two-part adhesive principally made of an epoxy resin. However, another type of adhesive may be used for the adhesive 200. The adhesive 200 is introduced into the central beam 20 using an adhesive ejection gun, for example. When the adhesive 200 is introduced into the central beam 20 through the inlet ports 70, 74, the adhesive 200 moves in the central beam 20 and reaches the confirmation holes 72, 76. The holes 72, 76, which are reached by the adhesive 200, are closed by a non-illustrated tape. After the adhesive 200 has reached all of the holes 72, 76, the adhesive 200 stops being introduced into the central beam 20.

In step S11, the securing pin 150 is removed and the support rod 24 (see FIG. 2) is attached (provisionally fastened) to the central beam 20 by the rod support bolt 46. Thereafter, the subframe 12 is left to stand on the jig 140 for a certain period of time until the adhesive 200 is set.

After the subframe 12 has been left to stand on the jig 140 for a certain period of time, various tests are carried out to examine the subframe 12, including an adhesive curing test, an ultrasonic test, etc. Thereafter, in step S12, the subframe 12 is removed from the jig 140.

3. Advantages of the Present Embodiment

According to the present embodiment, as described above, during the process of assembling the subframe 12 (joining process), the distance between the front wall 30 (first fastening surface) of the central beam 20 (first member) and the front wall 90 (second fastening surface) of the side brackets 22L, 22R (second member) is adjusted using the front bolts 60 (fastener), so as to adjust the distance between the slanted wall 38 (first bonding surface) of the central beam 20 and the slanted walls 98 (second bonding surface) of the side brackets 22L, 22R, and thereby adjust the thickness (front thickness Tf) of the adhesive layer that is applied or is to be applied between the slanted walls 38, 98 (see FIGS. 10A and 10B). Therefore, it is possible to manage easily the thickness of the layer of the adhesive 200 that is used to join the central beam 20 and the side brackets 22L, 22R to each other.

According to the present embodiment, the front bolts 60 (fastener) are adjusted in position with the wires 130 (spacer) being disposed between the slanted wall 38 (first bonding surface) of the central beam 20 and the slanted walls 98 (second bonding surface) of the side brackets 22L, 22R (see FIG. 8). Therefore, it is possible for the distance between the slanted walls 38, 98 to be adjusted with ease. As a result, the thickness (front thickness Tf) of the adhesive layer of the adhesive 200 can easily be adjusted.

According to the present embodiment, the ends 99L, 99R (first joint) of the central beam 20 and the joint portions 80 (second joint) of the side brackets 22L, 22R are of a closed cross-sectional shape (see FIG. 3). When the ends 99L, 99R are fitted over the bracket joint portions 80, the central beam 20 and the side brackets 22L, 22R are fastened to each other by the front bolts 60, and are bonded to each other by the adhesive 200 (steps S5 to S7, steps S7 to S8, and steps S8 to S10 in FIG. 11). The central beam 20 and the side brackets 22L, 22R are fastened to each other by the front bolts 60 and are bonded to each other by the adhesive 200 while the closed cross-sectional shapes thereof are interfitted. Consequently, it is possible to widen the areas that are coated with the adhesive 200, thereby making it possible to increase the strength with which the central beam 20 and the side brackets 22L, 22R are joined together.

Each of the ends 99L, 99R (first joint) of the central beam 20 includes, in addition to the front wall 30 (first fastening surface) and the slanted wall 38 (first bonding surface), the rear wall 32 and the top wall 34 (adhesive introducing surface), which are equipped with the rear inlet ports 70 and the upper inlet ports 74 defined therein. After the ends 99L, 99R of the central beam 20 and the joint portions 80 (second joint) of the side brackets 22L, 22R have been interfitted, the distance between the front wall 30 and the front wall 90 is adjusted using the front bolts 60 (fastener), so as to adjust the distance between the slanted wall 38 and the slanted wall 98 (second bonding surface). Thereafter, the adhesive 200 is introduced through the rear inlet ports 70 and the upper inlet ports 74 (S10 in FIG. 11). Since the adhesive 200 is introduced into other regions in addition to the region between the front wall 30 (first bonding surface) and the front wall 90 (second bonding surface), the central beam 20 and the side brackets 22L, 22R are joined together more strongly.

According to the present embodiment, the central beam 20 is made of CFRP, whereas the side brackets 22L, 22R are made of aluminum. In this manner, the subframe 12 (vehicular structural body) can be reduced in weight.

B. Modifications

The present invention is not limited to the above embodiment. Various modifications may be made to the present invention based on the details of the description of the invention. For example, the present invention may be modified in the following ways.

1. Subframe 12 (Vehicular Structural Body):

In the above embodiment, the subframe 12 is illustrated as a vehicular structural body. However, the present invention may also be applied to other types of vehicular structural bodies, which are made up of a plurality of members joined together. For example, the vehicular structural body may be a chassis, a body, a suspension arm, or the like.

2. Central Beam 20 (First Member) and Side Brackets 22L, 22R (Second Member):

[2-1. Material]

In the above embodiment, the central beam 20 is made of CFRP and the side brackets 22L, 22R are made of aluminum. From the standpoint of adjusting the thickness of the layer of the adhesive 200, and in particular for adjusting the front thickness Tf, the central beam 20 and the side brackets 22L, 22R, which are to be joined together, may be made of materials other than those described above. Further, the materials of the members need not necessarily be different from each other, but may be the same as each other. For example, the central beam 20 may be made of an engineering plastic other than CFRP, and the side brackets 22L, 22R may be made of a metal other than aluminum, e.g., magnesium or steel. Alternatively, each of the central beam 20 and the side brackets 22L, 22R may be made of metal or resin.

[2-2. Positional Relationship Between Front Walls 30, 90 (Bolt Tightening Surfaces) and Slanted Walls 38, 98 (Thickness Adjusting Surfaces)]

In the above embodiment, the front walls 30, 90 (bolt tightening surfaces) where the front bolts 60 are tightened, and the slanted walls 38, 98 (thickness adjusting surfaces) where the thickness of the layer of the adhesive 200 is adjusted are disposed adjacent to each other. However, from the standpoint of adjusting the distance between the thickness adjusting surfaces by tightening the bolts provided on the bolt tightening surfaces, the bolt tightening surfaces and the thickness adjusting surfaces need not necessarily be disposed at positions adjacent to each other, insofar as they are inclined (but not perpendicular) with respect to each other. For example, bolts may be tightened on the rear walls 32, 92 in order to adjust the distance between the slanted walls 38, 98, thereby adjusting the front thickness Tf. Since they are disposed close to each other, the bolt tightening surfaces and the thickness adjusting surfaces, which are disposed adjacent to each other, facilitate the adjustment of the front thickness Tf.

In the above embodiment, an obtuse angle, i.e., an angle greater than 90° and less than 180°, is formed between the front walls 30, 90 (bolt tightening surfaces) where the front bolts 60 are tightened, and the slanted walls 38, 98 (thickness adjusting surfaces) where the thickness of the layer of the adhesive 200 is adjusted (see FIG. 6). However, from the standpoint of adjusting the distance between the thickness adjusting surfaces by tightening the bolts provided on the bolt tightening surfaces, the angle formed between the bolt tightening surfaces and the thickness adjusting surfaces may be an acute angle, i.e., an angle greater than 0° and less than 90°. Alternatively, if the ends 99L, 99R of the central beam 20 and the joint portions 80 of the side brackets 22L, 22R are of a rectangular shape, then the bolt tightening surfaces and the thickness adjusting surfaces on the ends 99L, 99R and the joint portions 80 may be positioned in alignment with each other.

[2-3. Cross-Sectional Shape of Joint Regions]

In the above embodiment, the ends 99L, 99R of the central beam 20 and the joint portions 80 of the side brackets 22L, 22R are of a closed cross-sectional shape (see FIG. 3). However, from the standpoint of adjusting the thickness of the adhesive layer of the adhesive 200, and in particular for adjusting the front thickness Tf, a closed cross-sectional shape is not strictly required.

3. Bolt Tightening Positions:

In the above embodiment, the front bolts 60 and the lower bolts 64 are used to join the central beam 20 and the side brackets 22L, 22R to each other (see FIG. 8). More specifically, the bolt tightening positions are provided on the front walls and the bottom walls. However, from the standpoint of adjusting the thickness of the adhesive layer of the adhesive 200, and in particular for adjusting the front thickness Tf, the bolt tightening positions are not limited to positions on the front walls and the bottom walls. For example, only the front bolts 60 may be used, and the lower bolts 64 may be dispensed with. Alternatively, instead of or in addition to the front bolts 60, other bolts may be used in order to adjust the distance between the top walls 34, 94 and to thereby adjust the front thickness Tf.

4. Positions for Adjusting Thickness of Adhesive Layer of Adhesive 200:

In the above embodiment, for enabling adjustment of the thickness of the adhesive layer of the adhesive 200, particular importance is attached to the distance between the slanted walls 38, 98 (front thickness Tf) and the distance between the bottom walls 36, 96 (lower thickness Tl). However, positions where importance is attached to the thickness of the adhesive layer of the adhesive 200 may be modified as desired. For example, in the above embodiment, although the front thickness Tf is adjusted using the slanted walls 38, 98 and the front bolts 60, the slanted walls 38, 98 (first and second bonding surfaces) may be provided at other locations.

5. Application of Adhesive 200:

[5-1. Application Positions]

In the above embodiment, the adhesive 200 is applied entirely over the inner surfaces (beam joint surfaces 120) of the ends 99L, 99R of the central beam 20, and entirely over the outer surfaces (bracket joint surfaces 122) of the joint portions 80 of the side brackets 22L, 22R. However, insofar as management of the front thickness Tf is concerned, the adhesive 200 may be applied only to certain regions thereof. For example, the adhesive 200 may be applied only to the slanted walls 38, 98.

[5-2. Application and Supply Timing]

In the above embodiment, the adhesive 200 is applied to the ends 99L, 99R of the central beam 20 and the bracket joint portions 80 while the central beam 20 and the side brackets 22L, 22R are separated from each other (step S2 in FIG. 11). However, from the standpoint of adjusting the thickness of the adhesive layer of the adhesive 200, and in particular for adjusting the front thickness Tf, the adhesive 200 may be applied or supplied subsequently in such a manner that the adhesive is applied or supplied between the slanted walls 38, 98 after the ends 99L, 99R of the central beam 20 have been fitted over the joint portions 80 of the side brackets 22L, 22R.

[5-3. Inlet Ports]

In the above embodiment, the rear inlet ports 70 and the upper inlet ports 74 are provided as inlet ports for introducing the adhesive 200 (see FIGS. 3 and 4). However, from the standpoint of adjusting the thickness of the adhesive layer of the adhesive 200, and in particular for adjusting the front thickness Tf, the inlet ports for introducing the adhesive 200 are not limited to the rear inlet ports 70 and the upper inlet ports 74. For example, only one of the rear inlet ports 70 or the upper inlet ports 74 may be provided as inlet ports for introducing the adhesive 200. Alternatively, inlet ports for introducing the adhesive 200 may be defined in any of the front wall 30, the bottom wall 36, or the slanted wall 38 of the central beam 20, for example. Further, inlet ports do not need to be provided if the adhesive 200 is applied in advance and will not be applied thereafter.

In the above embodiment, the rear inlet ports 70 and the upper inlet ports 74 are provided in the positions and quantities shown in FIGS. 3 and 4. However, from the standpoint of adjusting the thickness of the adhesive layer of the adhesive 200, and in particular for adjusting the front thickness Tf, the rear inlet ports 70 and the upper inlet ports 74 are not limited to the positions and quantities shown in the figures, but the positions and quantities of the rear inlet ports 70 and the upper inlet ports 74 may be changed as desired.

6. Wires 130 (Spacers):

In the above embodiment, the wires 130 are used for managing the front thickness Tf and the lower thickness Tl. However, other members apart from the wires 130 may be used, insofar as such members function as spacers for managing the front thickness Tf and the lower thickness Tl. From the standpoint of managing the front thickness Tf and the lower thickness Tl, another process, which does not make use of spacers such as the wires 130 or the like, e.g., a measuring process using a measuring instrument, may be carried out in order to manage the front thickness Tf and the lower thickness Tl.

In the above embodiment, the same wires 130 are used for managing both the front thickness Tf and the lower thickness Tl. However, wires having different specifications may be used, respectively, for managing the front thickness Tf and the lower thickness Tl. Stated otherwise, the front prescribed value Vf and the lower prescribed value V1 may be set to different values.

7. Other Applications:

In the above-described embodiment, the concept of the present invention is applied to the subframe 12 which serves as a vehicular structural body. However, from the standpoint of adjusting the thickness of the adhesive layer of the adhesive 200, the present invention may be applied to other structures apart from a vehicular structural body. For example, the present invention may be applied to structural bodies of other mobile objects such as airplanes, ships, or the like. The present invention also is applicable to structural bodies of other objects such as industrial machines, architectural structures, or the like.

While the invention has been particularly shown and described with reference to a preferred embodiment, it will be understood that variations and modifications can be effected thereto by those skilled in the art without departing from the scope of the invention as defined by the appended claims.

What is claimed is:

1. A method of manufacturing a vehicle subframe configured to support an engine, a steering mechanism and at least one suspension component thereon, said vehicle subframe including a vehicular structural body made up of a first member and a second member which are joined to each other, wherein the first member has an engine support structure and a first joint to be joined to the second member, and the second member has a second joint to be joined to the first member, the method comprising the steps of:

joining the first joint and the second joint to each other by fastening the first joint and the second joint to each other with a fastener, and bonding the first joint and the second joint to each other with an adhesive;

wherein the first joint has a first fastening surface fastened by the fastener, and a first bonding surface inclined with respect to the first fastening surface and bonded by the adhesive, the first bonding surface being continuous with the first fastening surface and forming an angle greater than 90 degrees with the first fastening surface; and the second joint has a second fastening surface that faces toward the first fastening surface and is fastened by the fastener, and a second bonding surface, which is inclined with respect to the second fastening surface in confronting relation to the first bonding surface, and is bonded by the adhesive, the second bonding surface being continuous with the second fastening surface and forming an angle greater than 90 degrees with the second fastening surface;

wherein the step of joining further comprises the step of:

bringing the first fastening surface and the second fastening surface close to each other with the fastener in order to shorten a distance between the first bonding surface and the second bonding surface, thereby enabling a thickness of an adhesive layer of the adhesive, which is applied or is to be applied between the first bonding surface and the second bonding surface, to be adjusted.

2. The method according to claim 1, further comprising the step of:

positionally adjusting the fastener while a spacer is placed between the first bonding surface and the second bonding surface.

3. The method according to claim 1, wherein each of the first joint and the second joint is of a closed cross-sectional shape; and the step of joining further comprises the step of:

fastening the first joint and the second joint to each other with the fastener, and bonding the first joint and the second joint to each other with the adhesive while the first joint and the second joint are interfitted.

4. The method according to claim 3, wherein the first joint further includes an adhesive introducing surface having an inlet port defined therein for introducing the adhesive into the first member; and the method further comprises the step of:

after the first joint and the second joint have been interfitted, adjusting the distance between the first fastening surface and the second fastening surface with the fastener, and thereafter introducing the adhesive into the first member through the inlet port.

5. The method according to claim 1, wherein the first member is made of carbon-fiber-reinforced plastic and the second member is made of aluminum.

6. A vehicle subframe configured to support an engine, a steering mechanism and at least one suspension component thereon, said vehicle subframe including a vehicular structural body comprising a first member and a second member of a vehicle, wherein:

the first member comprises an engine support structure and a first joint to be joined to the second member;

the second member comprises a second joint to be joined to the first member;

the vehicular structural body further comprising:

a fastener for fastening the first joint and the second joint to each other; and an adhesive for bonding the first joint and the second joint to each other;

the first joint has a first fastening surface fastened by the fastener, and a first bonding surface inclined with respect to the first fastening surface and bonded by the adhesive, the first bonding surface being continuous with the first fastening surface and forming an angle greater than 90 degrees with the first fastening surface;

the second joint has a second fastening surface that faces toward the first fastening surface and is fastened by the fastener, and a second bonding surface, which is inclined with respect to the second fastening surface in confronting relation to the first bonding surface, and is bonded by the adhesive, the second bonding surface being continuous with the second fastening surface and forming an angle greater than 90 degrees with the second fastening surface; and the fastener comprises an adhesive thickness adjusting member for bringing the first fastening surface close to the second fastening surface in order to shorten a distance between the first bonding surface and the second bonding surface, thereby adjusting the thickness of an adhesive layer of the adhesive, which is disposed between the first bonding surface and the second bonding surface.

7. The vehicle subframe according to claim 6, wherein each of the first joint and the second joint is of a closed cross-sectional shape, and the first joint and the second joint are fastened to each other with the fastener, and the first joint and the second joint are bonded to each other with the adhesive while the first joint and the second joint are interfitted.

8. The vehicle subframe according to claim 7, wherein the first joint further includes an adhesive introducing surface having an inlet port defined therein for introducing the adhesive into the first member; and after the first joint and the second joint have been interfitted, the distance between the first fastening surface and the second fastening surface is adjusted with the fastener, and thereafter the adhesive is introduced into the first member through the inlet port.

9. The vehicle subframe according to claim 6, wherein the first member is made of carbon-fiber-reinforced plastic and the second member is made of aluminum.

10. A method of manufacturing a vehicle subframe configured to support an engine, a steering mechanism and at least one suspension component thereon, said vehicle subframe including a vehicular structural body comprising a first member and a second member which are joined to each other, wherein the first member has an engine support structure and a hollow first joint to be joined to the second member, and the second member has a second joint to be joined to the first member, the method comprising the steps of:

slidably inserting the second joint into the hollow first joint;

joining the first joint and the second joint to each other by fastening the first joint and the second joint to each other with a threaded fastener; and bonding the first joint and the second joint to each other with an adhesive;

wherein:

the first joint has a first fastening surface fastened by the threaded fastener, and a first bonding surface inclined with respect to the first fastening surface and bonded by the adhesive;

the second joint has a second fastening surface that faces toward the first fastening surface and is fastened by the threaded fastener, and a second bonding surface, which is inclined with respect to the second fastening surface in confronting relation to the first bonding surface, and is bonded by the adhesive;

and wherein the step of joining further comprises the step of:

bringing the first fastening surface and the second fastening surface close to each other by tightening the threaded fastener in order to shorten a distance between the first bonding surface and the second bonding surface, thereby enabling a thickness of an adhesive layer of the adhesive, which is applied or is to be applied between the first bonding surface and the second bonding surface, to be adjusted.

11. The method according to claim 10, further comprising the step of tightening the threaded fastener while a spacer is in place between the first bonding surface and the second bonding surface.

12. The method according to claim 10, wherein each of the first joint and the second joint is of a closed cross-sectional shape; and the step of joining further comprises the step of:

fastening the first joint and the second joint to each other with the threaded fastener, and bonding the first joint and the second joint to each other with the adhesive while the first joint and the second joint are interfitted.

13. The method according to claim 12, wherein the first joint further includes an adhesive introducing surface having an inlet port defined therein for introducing the adhesive into the first member; and the method further comprises the step of:

after the first joint and the second joint have been interfitted, reducing the distance between the first fastening surface and the second fastening surface by tightening the fastener, and thereafter introducing the adhesive into the first member through the inlet port.

14. The method according to claim 10, wherein the first member is made of carbon-fiber-reinforced plastic and the second member is made of aluminum.

15. The method of claim 1, wherein the first joint further includes an adhesive introducing surface having an inlet port defined therein for introducing the adhesive into the first member; and wherein the first member has a plurality of confirmation holes formed therein proximate the inlet port, for allowing some of the adhesive to escape during assembly, thereby confirming an extent to which the adhesive has been introduced into the first joint.

16. The vehicle subframe according to claim 7, wherein the first joint further includes an adhesive introducing surface having an inlet port defined therein for introducing the adhesive into the first member; and wherein the first member has a plurality of confirmation holes formed therein proximate the inlet port, for allowing some of the adhesive to escape during assembly, thereby confirming an extent to which the adhesive has been introduced into the first joint.

17. The method of claim 10, wherein the first joint further includes an adhesive introducing surface having an inlet port defined therein for introducing the adhesive into the first member; and wherein the first member has a plurality of confirmation holes formed therein proximate the inlet port, for allowing some of the adhesive to escape during assembly, thereby confirming an extent to which the adhesive has been introduced into the first joint.

\* \* \* \* \*